United States Patent
Donovan

[11] Patent Number: 5,217,378
[45] Date of Patent: Jun. 8, 1993

[54] PAINTING KIT FOR THE VISUALLY IMPAIRED

[76] Inventor: Karen R. Donovan, 621 Abrams, Green Bay, Wis. 54302

[21] Appl. No.: 954,271

[22] Filed: Sep. 30, 1992

[51] Int. Cl.$^5$ .................. G06K 9/00; G09B 11/10
[52] U.S. Cl. ...................... 434/116; 434/84; 434/112; 434/117
[58] Field of Search ............ 434/84, 85, 112, 115, 434/116, 117

[56] References Cited

U.S. PATENT DOCUMENTS

| | | | |
|---|---|---|---|
| 1,372,360 | 3/1921 | McNeill | 434/117 |
| 2,371,153 | 3/1945 | Connelly | |
| 2,616,198 | 11/1952 | Sewell | 434/112 X |
| 3,247,604 | 4/1966 | Davis | 434/84 |
| 3,373,508 | 3/1968 | Brass | 434/112 |
| 3,535,791 | 10/1970 | Oppenheim | 434/85 X |
| 3,570,139 | 3/1971 | Ladd et al. | |
| 4,073,070 | 2/1978 | Boston | |
| 4,214,125 | 7/1980 | Mozer et al. | 179/1 SM |
| 4,223,447 | 9/1980 | Greenlees | 434/117 X |
| 4,314,105 | 2/1982 | Mozer | 434/15.55 R |
| 4,384,169 | 5/1983 | Mozer et al. | 179/1 SM |
| 4,384,170 | 5/1983 | Mozer et al. | 179/1 SM |
| 4,415,326 | 11/1983 | Nagata et al. | 434/113 |
| 4,416,632 | 11/1983 | Berman | 434/84 |
| 4,433,434 | 2/1984 | Mozer | 381/30 |
| 4,435,831 | 3/1984 | Mozer | 381/30 |
| 4,458,110 | 7/1984 | Mozer | 381/32 |
| 4,650,421 | 3/1987 | Anczurowski | 434/113 |
| 4,687,203 | 8/1987 | Spector | 434/333 X |
| 4,728,212 | 3/1988 | Spector | 401/88 |
| 4,762,493 | 8/1988 | Anderson | 434/84 |
| 4,878,844 | 11/1989 | Gasper et al. | 434/159 |
| 5,039,243 | 8/1991 | O'Brien | 401/49 |

OTHER PUBLICATIONS

"Raised Line Drawing Kit" Aids & Appliances; Jun. 1973 p. 55.
"Art School Helps Puerto Rico Blind" The New York Times, Mar. 22, 1954, p. C29.

*Primary Examiner*—Gene Mancene
*Assistant Examiner*—L. Thomas
*Attorney, Agent, or Firm*—Charles F. Meroni, Jr.

[57] ABSTRACT

The painting kit is proposed for use by the visually impaired and includes a board having a clip at one end thereof, at least one drawing sheet having a shape defined thereon by means of a raised ridge, and at least one bottle of specifically scented paint, the bottle having a braille indication of the color of paint therein, thereon. The drawing sheet is of such dimensions as to be engaged to the board by the clip. The board further includes actuatable buttons on a top surface thereof functionally engaged to a voice synthesizer for causing at least one voice message to be produced, the voice message defining at least one characteristic of the shape, such as its color.

32 Claims, 2 Drawing Sheets

PAINTING KIT FOR THE VISUALLY IMPAIRED

BACKGROUND OF THE INVENTION

1. Field of the Invention

The present invention relates to a painting kit for the visually impaired. More particularly, the kit comprises bottles of various colors of paint, each identifiable by scent as well as by braille characters on each bottle, a board having a particular shape defined thereon, the borders of the shape being raised for tactility, and the board further including at least one voice message producing element therein identifying the shape when pressure is applied against an actuating button and preprinted sheets of paper having the particular corresponding shape thereon defined by raised borders and identified by braille as well. The board may include further voice messages and actuating buttons therefor within the shape, to identify various features thereof.

2. Description of the Prior Art

Heretofore, various media, such as coloring or colored media wherein each color has a distinctive scent, have been proposed, as disclosed in U.S. Pat. Nos. 4,687,203; 4,728,212; 4,762,493, and 5,039,243.

Further, pictures to be colored having tactile outlines and color indicators have been proposed in U.S. Pat. Nos. 2,371,153; 4,073,070, and 4,650,421. Also, tactile sensibility testing and teaching devices have been proposed in U.S. Pat. Nos. 3,570,139; 4,415,326 and 4,878,844.

And, finally, methods and apparatus for speech synthesis have been proposed in the Mozer U.S. Pat. Nos. 4,214,125; 4,314,105; 4,384,169; 4,384,170; 4,433,434; 4,435,831, and 4,458,110.

However, as will be described in greater detail hereinafter, nowhere is disclosed a painting kit for the visually impaired as described herein.

SUMMARY OF THE INVENTION

According to the invention there is provided a painting kit for use by the visually impaired. The kit includes bottles of scented paints the colors of which are also identified in braille. Also provided is a work board and sheets printed with a pattern matching a pattern on the board. Both the printed sheet and the work board have the outline or border raised to provide tactile indication of the shape as well as a braille identification. Further, when pressure is applied against one area of the board, a vocal indication of the shape is produced, and, if desired such indicators could be provided in the area encompassed by the shape for indication of the color to be applied or other feature of the shape, providing numerous sensory inputs, for increased learning.

DESCRIPTION OF THE PREFERRED EMBODIMENT

Figure 1:
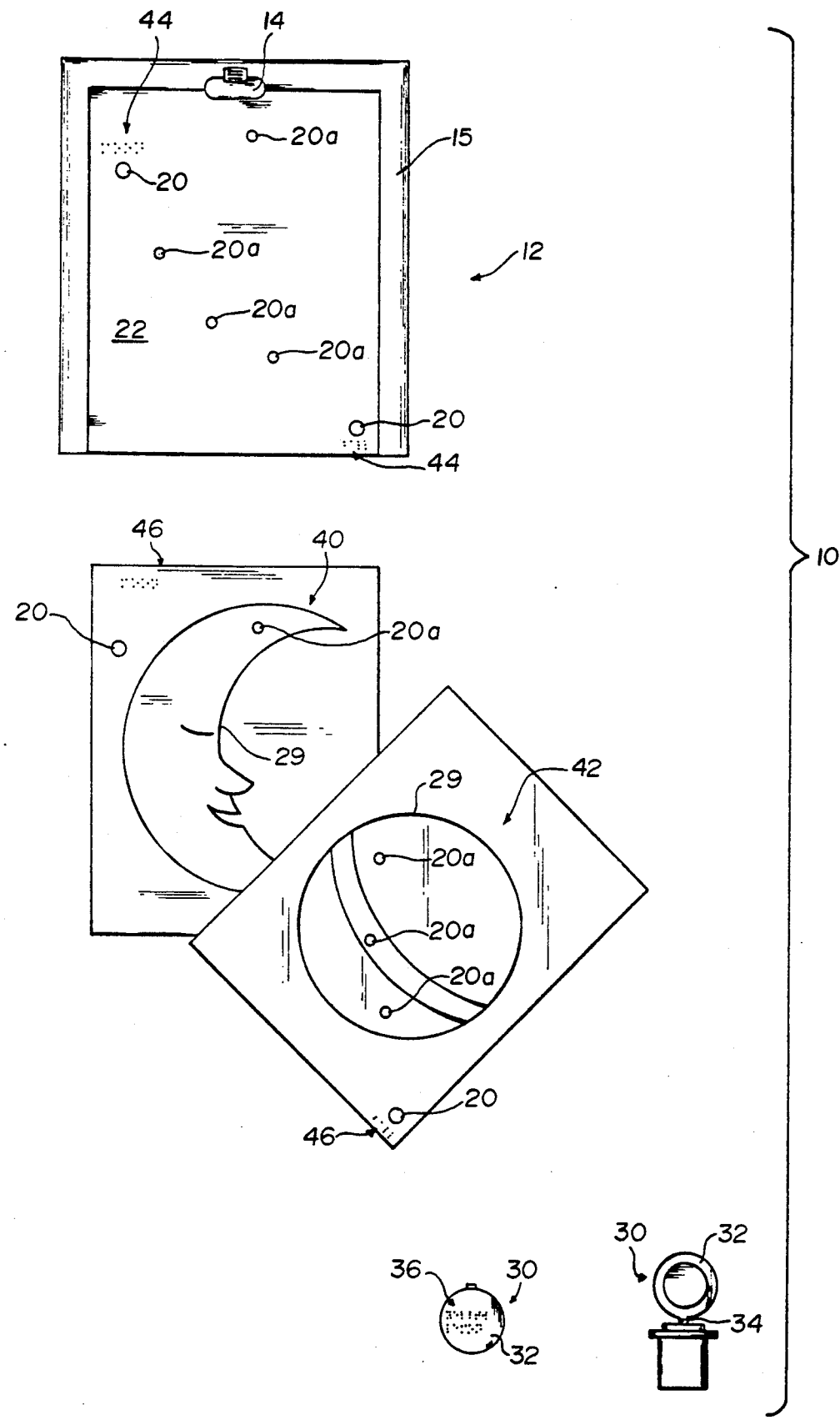
FIG. 1 is a perspective view of one kit made in accordance with the teachings of the present invention showing all components thereof.
Figure 2:
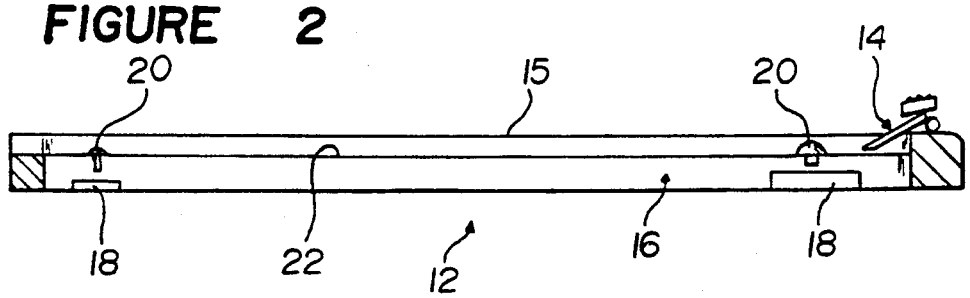
FIG. 2 is a cross sectional view through a board of FIG. 1 and shows one voice message actuating button therein.

Referring now to the drawings in greater detail there is illustrated therein the painting kit made in accordance with the teachings of the present invention and generally identified by the reference numeral 10.

As shown, the kit 10 includes several items. First shown is a work board 12. This work board 12 comprises a stiff, planar element which includes a clip 14 at one end thereof by means of which an article can be clasped to the board 12. Also, if desired, a peripheral lip 15 may be provided therearound.

The board 12 is layered, with a pocket 16 formed therein within which voice message producing means 18, such as a voice synthesizer, can be seated as will be defined in greater detail hereinafter, with actuators 20 for the voice message producing means 18 being present at preselected locations on a top surface 22 of the board 12.

Figure 3:
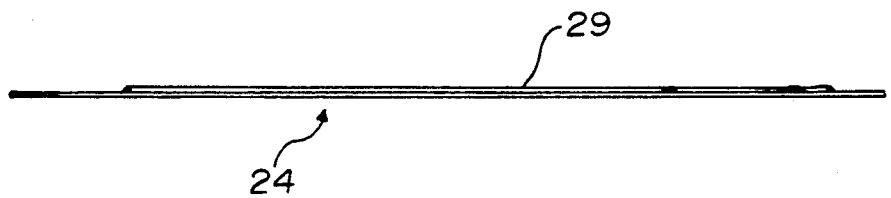
FIG. 3 is a cross sectional view through a painting sheet of FIG. 1 and shows that an outline of an object to be painted is raised.
Figure 5:
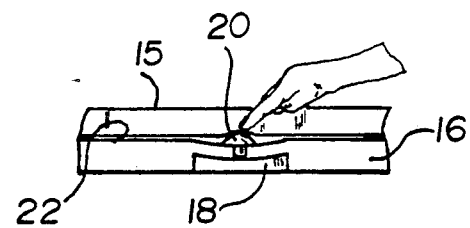
FIG. 5 shows one of the voice indicators mounted in the board being activated by the fingers of the painter.
Figure 4:
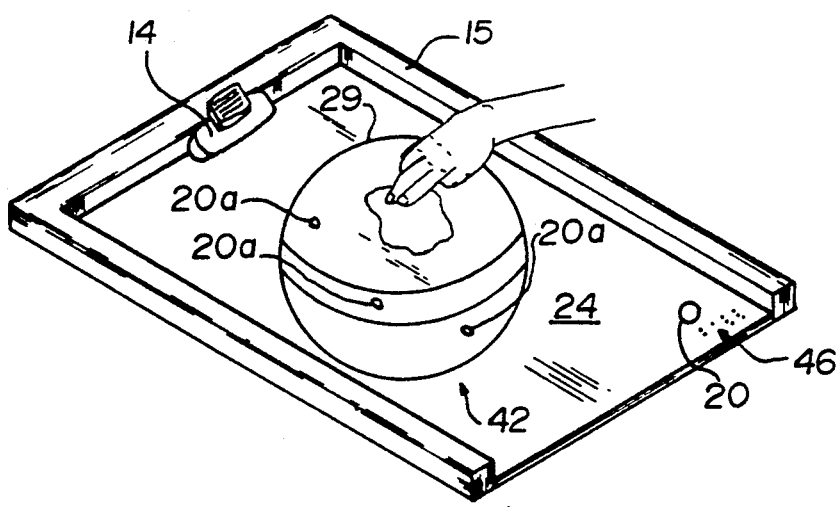
FIG. 4 shows a painting sheet mounted on the board being finger painted.

To make the board 12 reusable, picture sheets 24 are provided upon which all painting is to be carried out. The sheets 24 are sized and configured to cover the top surface 22 of the board 12 and to be engaged in position by the board clip 14. As shown best in FIG. 3, the sheet 24 has a particular shape thereon which is outlined by a raised lip or ridge 29, providing a tactile indication of a particular area or shape to be painted.

The sheets 24, it will be noted, overlie the voice actuators 20 provided on the top surface 22 of the board 12.

In this respect, it is proposed that the shape or picture being painted be identified auditorily, as well as by tactile means, to provide a further sensory input, to inherently increase learning levels.

Inasmuch as the kit 10 is proposed for use in finger painting, a plurality of bottles 30 of paint are provided in each kit 10. Each bottle 30 included has a snap-on lid 32 engaged to the bottle by a banded collar 34. A braille indication 36 of the color of the paint within each bottle 30 is provided, either on the top or lid 32 or on the bottle 30 itself. Further, each color of paint is provided with a particular scent, such as lemon for yellow, mint for green, etc. By providing a scent as well as a tactile color indication, sensory input is again increased, increasing the level of learning.

In use of the kit 10, one first engages a painting sheet 24 to the board 12 using the clip 14 to secure the sheet 24 in position.

Next, to identify the image or shape to be finger painted, a voice message actuating button 20 positioned on the board 12 outside the shape is pressed. A voice message such as "ball" or "crescent moon" is produced upon pressing the button 20.

Next, a user slides his fingers around within the confines of the shape until a secondary voice message actuating button 20a is encountered.

This secondary button 20a may indicate a particular color to be used, or may indicate a particular shape or area to be particularly colored within the primary shape shown, such as may be seen on the sheet 24 having a ball 30 shown thereon.

Obviously, where the crescent moon 32 is to be colored in, the actuating button 20a for same would probably identify the shape with the terms "yellow" or "yellow crescent", and, if the board 24 were designed to accommodate two shapes, rather than one, such actuating button 20 would be positioned in an area outside the shape.

In one preferred embodiment of the kit 10, the board 24 is specific to one drawing or shape so as not to cause confusion to the visually impaired person, although this is not to be construed as limiting.

Thus, when the user fills in the shape, crescent moon 40 or ball 42 on the drawing sheet 24 with color during finger painting, multiple contacts are created with a particular button 20a reinforcing whatever message is programmed therein, over and over again.

As shown in the Figures, it will be understood that the board 12 and drawing sheet 24 may also be provided with a braille description of what is shown, such as at 44 on the board 12 and at 46 on the sheet 24.

As described above, the kit 10 of the present invention provides a number of advantages, some of which have been described above and others of which are inherent in the invention. Also, modifications can be proposed to the kit 10 without departing from the teachings herein. Accordingly, the scope of the invention is only to be limited as necessitated by the accompanying claims.

I claim:

1. A painting kit for use by the visually impaired comprising: a board having a clip at one end thereof; at least one drawing sheet having a shape defined thereon by means of a raised ridge; at least one bottle of specifically scented paint, said bottle having a braille indication of the color of paint therein, thereon; said drawing sheet being of such dimensions as to be engaged to said board by said clip; and said board further including actuatable means for causing at least one voice message to be produced upon pressing thereof, said actuatable means being functionally engaged to voice message producing means provided within the board, said voice message defining at least the shape.

2. The kit of claim 1 wherein said board can accommodate more than one drawing sheet.

3. The kit of claim 2 wherein a plurality of bottles of paint are provided.

4. The kit of claim 3 wherein each color of paint has a specific scent associated therewith.

5. The kit of claim 4 wherein said voice message producing means comprise of voice synthesizer.

6. The kit of claim 5 wherein said actuatable means comprise a button to be pressed.

7. The kit of claim 6 wherein said button is on a surface of the board covered by said drawing sheet.

8. The kit of claim 7 wherein said button is positioned in an area outside of said shape.

9. The kit of claim 8 wherein at least one secondary button is provided in an area within said shape.

10. The kit of claim 9 wherein said secondary button is functionally engaged to second voice message producing means.

11. The kit of claim 10 wherein said second voice message producing means produce a message when actuated which is indicative of a characteristic of said shape, such as its color.

12. A painting kit for use by the visually impaired comprising: a board having a clip at one end thereof; at least one drawing sheet having a shape defined thereon by means of a raised ridge; at least one bottle of specifically scented paint, said drawing sheet being of such dimensions as to be engaged to said board by said clip; and said board further including actuatable means for causing at least one voice message to be produced upon pressing thereof, said actuatable means being functionally engaged to voice message producing means provided within the board, said voice message defining at least the shape.

13. The kit of claim 12 wherein said board can accommodate more than one drawing sheet.

14. The kit of claim 13 wherein a plurality of bottles of paint are provided.

15. The kit of claim 14 wherein each color of paint has a specific scent associated therewith.

16. The kit of claim 15 wherein said voice message producing means comprise of voice synthesizer.

17. The kit of claim 12 wherein said actuatable means comprise a button to be pressed.

18. The kit of claim 17 wherein said button is on a surface of the board covered by said drawing sheet.

19. The kit of claim 17 wherein said button is positioned in an area outside of said shape.

20. The kit of claim 19 wherein at least one secondary button is provided in an area within said shape.

21. The kit of claim 20 wherein said secondary button is functionally engaged to second voice message producing means.

22. The kit of claim 21 wherein said second voice message producing means produce a message when actuated which is indicative of a characteristic of said shape, such as its color.

23. A painting kit for use by the visually impaired comprising: a board having a clip at one end thereof; at least one drawing sheet having a shape defined thereon by means of a raised ridge; at least one bottle of paint having a braille indication of the color or paint therein, thereon; said drawing sheet being of such dimensions as to be engaged to said board by said clip; and said board further including individually selectable actuatable means at different locations on the board for causing at least one voice message to be produced upon pressing thereof, said actuatable means being functionally engaged to voice message producing means provided within the board, said voice message defining at least the shape, said board being constructed to accommodate more than one shape of drawing sheet.

24. The kit of claim 23 wherein a plurality of bottles of paint are provided with braille thereon indicating paint color therein.

25. The kit of claim 24 wherein each bottle has a specific scented paint therein to indicate a predesignated color.

26. The kit of claim 25 wherein said voice message producing means comprise of voice synthesizer.

27. The kit of claim 23 wherein said actuatable means comprises a series of spaced apart buttons critically oriented so as to be actuatable only when falling within the shape of the drawing selected from a group of drawings having different shapes.

28. The kit of claim 27 wherein said buttons are on a surface of the board covered by said drawing sheet.

29. The kit of claim 27 wherein one or more of said buttons are positioned in an area outside of said shape.

30. The kit of claim 27 wherein at least one secondary button is provided in an area within said shape.

31. The kit of claim 30 wherein said secondary button is functionally engaged to second voice message producing means.

32. The kit of claim 21 wherein said second voice message producing means produce a message when actuated which is indicative of a characteristic of said shape, such as its color.

* * * * *